(12) United States Patent
Hsin et al.

(10) Patent No.: US 8,913,697 B2
(45) Date of Patent: Dec. 16, 2014

(54) WIRELESS LAN COMMUNICATION DEVICE, RELEVANT SIGNAL PROCESSING CIRCUIT, AND METHOD THEREOF

(71) Applicant: Realtek Semiconductor Corp., Hsinchu (TW)

(72) Inventors: Chien-Wei Hsin, Kaohsiung (TW); Chung-Yao Chang, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 14 days.

(21) Appl. No.: 13/848,976

(22) Filed: Mar. 22, 2013

(65) Prior Publication Data
US 2013/0308731 A1    Nov. 21, 2013

(30) Foreign Application Priority Data

May 17, 2012    (TW) .............................. 101117542 A

(51) Int. Cl.
H04L 27/08      (2006.01)
H04B 1/10      (2006.01)

(52) U.S. Cl.
CPC ................ H04B 1/10 (2013.01); H04B 1/1036 (2013.01)

USPC .............................. 375/345; 341/139; 342/92

(58) Field of Classification Search
None
See application file for complete search history.

(56) References Cited

U.S. PATENT DOCUMENTS

| | | |
|---|---|---|
| 5,905,459 A | 5/1999 | Bunch |
| 2005/0059364 A1 | 3/2005 | Hansen et al. |
| 2010/0208712 A1* | 8/2010 | Wax et al. ...................... 370/338 |
| 2012/0314604 A1* | 12/2012 | Siomina et al. ............... 370/252 |
| 2013/0018622 A1* | 1/2013 | Samarasooriya et al. .... 702/111 |

* cited by examiner

*Primary Examiner* — Adolf Dsouza
(74) *Attorney, Agent, or Firm* — Birch, Stewart, Kolasch & Birch, LLP

(57) ABSTRACT

A wireless LAN communication device includes an amplifying circuit, an interference detection circuit, a false alarm counting circuit, and a control circuit. The amplifying circuit is configured to operably provide a gain to wireless signals. The interference detection circuit is configured to operably detect adjacent channel interference signals to generate a detection result. The false alarm counting circuit is configured to operably calculate a number of false alarms incurred by the adjacent channel interference signals. The control circuit is configured to operably configure the gain of the amplifying circuit according to the detection result and the number of false alarms.

15 Claims, 6 Drawing Sheets

| signal strength of input signal | gain of low-noise amplifying circuit | gains of variable gain amplifying circuit |
|---|---|---|
| from -10 dBm to 10 dBm and above | Gl | Gv1<br>Gv2<br>Gv3<br>Gv4 |
| from -40 dBm to -10 dBm | Gm | Gv1<br>Gv2<br>Gv3<br>Gv4 |
| below -40 dBm | Gh | Gv1<br>Gv2<br>Gv3<br>Gv4 |

FIG. 3

WIRELESS LAN COMMUNICATION DEVICE, RELEVANT SIGNAL PROCESSING CIRCUIT, AND METHOD THEREOF

CROSS-REFERENCE TO RELATED APPLICATIONS

This application claims the benefit of priority to Patent Application No. 101117542, filed in Taiwan on May 17, 2012; the entirety of which is incorporated herein by reference for all purposes.

BACKGROUND

The disclosure generally relates to a wireless LAN communication device and, more particularly, to the wireless LAN communication device which may reduce the impacts of the adjacent channel interference signals.

Many countries have reserve some radio bands for developing industrial, scientific, and medical applications, i.e., the industrial, scientific and medical radio bands (the ISM band). The wireless local area network (LAN) communication devices utilize the ISM band to perform communications, and have been successfully adopted in many applications.

Many other communication devices (e.g., the Bluetooth devices and the cordless telephones) also perform communications in the same or neighboring frequency bands in ISM band, and results in the impacts on the communication performance of the wireless LAN communication devices.

Moreover, the wireless LAN communication devices in different basic service sets may become interference signals to one another. For example, when a wireless LAN communication device is associated with a first access point, it may still receive the wireless signals transmitted from a second access point in another basic service set. Even if the second access point uses a different channel from the first access point, the adjacent channel interference still influences the communication performance between the wireless LAN communication device and the first access point. If the signals from the first access point and the second access point are received at the same time or at a similar time, the wireless LAN communication device may start the demodulation operations on the signals transmitted from the second access point. After the demodulation circuit of the wireless LAN communication device finds out that the signals are not transmitted from the first access point, the signals transmitted from the first access point cannot be received and demodulated. Thus, the communication performance between the wireless LAN device and the associated first access point may be seriously impacted.

Furthermore, when the signal strengths of the adjacent channel interference signals are strong, some receiver circuits of the wireless LAN communication device may be also saturated, e.g., the low-noise amplifying circuit. The demodulation performance and the communication performance deteriorate accordingly. Along with the wider adoption of the wireless LAN communication devices, the adjacent channel interference will result in the impacts on the communication performance and the inconvenience of the users.

SUMMARY

In view of the foregoing, it may be appreciated that a substantial need exists for methods and apparatuses that mitigate or reduce the problems above.

An example embodiment of a wireless LAN communication device, comprising: an amplifying circuit configured to operably provide a gain to a first wireless signal; an interference detection circuit configured to operably detect adjacent channel interference signals of the first wireless signal to generate a detection result; a false alarm counting circuit configured to operably calculate a number of false alarms incurred by the adjacent channel interference signals; and a control circuit configured to operably configure the gain of the amplifying circuit according to the detection result and the number of false alarms.

Another example embodiment of a wireless LAN communication device, configured to operably associate with a first access point, comprising: an amplifying circuit configured to operably provide a gain to a first wireless signal; a signal strength calculating circuit configured to operably calculate a signal strength of the first wireless signal; a demodulation circuit configured to operably demodulate the first wireless signal; and a control circuit coupled with the amplifying circuit, the signal strength calculating circuit, and the demodulation circuit; wherein the control circuit decreases the gain of the amplifying circuit when both following criteria are met: the signal strength of the first wireless signal is greater than a first signal strength threshold; and a number of demodulation operations performed by the demodulation circuit on wireless signals transmitted from a second access point is greater than a false alarm threshold.

Another example embodiment of a signal processing circuit of a wireless LAN communication device, configured to operably configure a gain which an amplifying circuit of the wireless LAN communication device provides to a wireless signal, comprising: an interference detection circuit configured to operably detect adjacent channel interference signals of the wireless signal to generate a detection result; a false alarm counting circuit configured to operably calculate a number of false alarms incurred by the adjacent channel interference signals; and a control circuit configured to operably configure the gain of the amplifying circuit according to the detection result and the number of false alarms.

Another example embodiment of a signal processing method for a wireless LAN communication device, comprising: detecting adjacent channel interference signals of a first wireless signal to generate a detection result; calculating a number of false alarms incurred by the adjacent channel interference signals; and configuring a gain of an amplifying circuit of the wireless LAN communication device according to the detection result and the number of false alarms.

Both the foregoing general description and the following detailed description are examples and explanatory only, and are not restrictive of the invention as claimed.

BRIEF DESCRIPTION OF THE DRAWINGS

FIG. 3 shows several example mappings between the gains of the amplifier circuits and the received signal strengths of the wireless communication LAN device in FIG. 1 according to one embodiment of the present disclosure.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
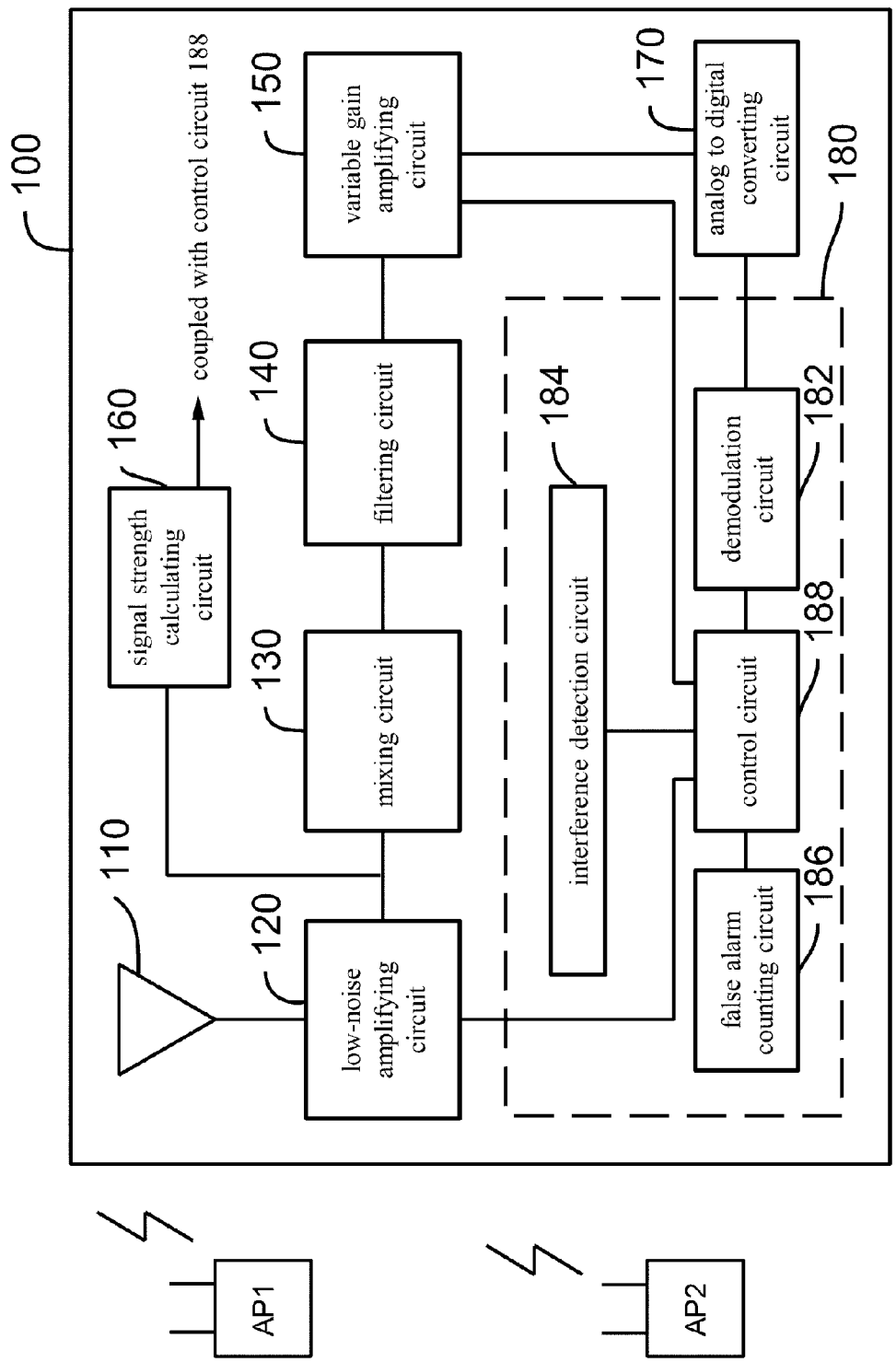
FIG. 1 shows a simplified functional block diagram of a wireless LAN communication device according to one embodiment of the present disclosure.

FIG. 1 shows a simplified functional block diagram of a wireless LAN communication device 100 according to one embodiment of the present disclosure. The wireless LAN communication device 100 is associated with an access point AP1 of a basic service set BSS1, and utilizes a channel in a frequency band F1 to transceive (transmit and/or receive) wireless signals. Moreover, in this embodiment, the wireless LAN communication device 100 may receive wireless signals from an access point AP2 of a basic service set BSS2.

The wireless LAN communication device 100 comprises an antenna 110, a low-noise amplifying circuit 120, a mixing circuit 130, a filtering circuit 140, a variable gain amplifying circuit 150, a signal strength calculating circuit 160, an analog to digital converting circuit 170, and a signal processing circuit 180. The signal processing circuit 180 comprises a demodulation circuit 182, an interference detection circuit 184, a false alarm counting circuit 186, and a control circuit 188. Some elements and connections of the wireless LAN communication device 100 are not shown in FIG. 1 for the purposes of conciseness and clearer explanation.

The antenna 110 is configured to operably receive the wireless signals, and transmit the wireless signals to other circuits for performing demodulation operations. The antenna 110 may be realized by one or more antennas.

The low-noise amplifying circuit 120 is configured to operably provide a gain to the wireless signals received by the antenna 110. The wireless signals received by the antenna 110 may be affected by several channel effects and noises. Even in typical wireless environments, the signal strengths of the wireless signals received by the wireless LAN communication device 100 may vary in a wide range, e.g., from less than −90 dBm to greater than 0 dBm. The low-noise amplifying circuit 120 may provide a suitable gain to the wireless signals according to the signal strengths of the wireless signals so that the demodulation operations may be performed more effectively.

Figure 2:
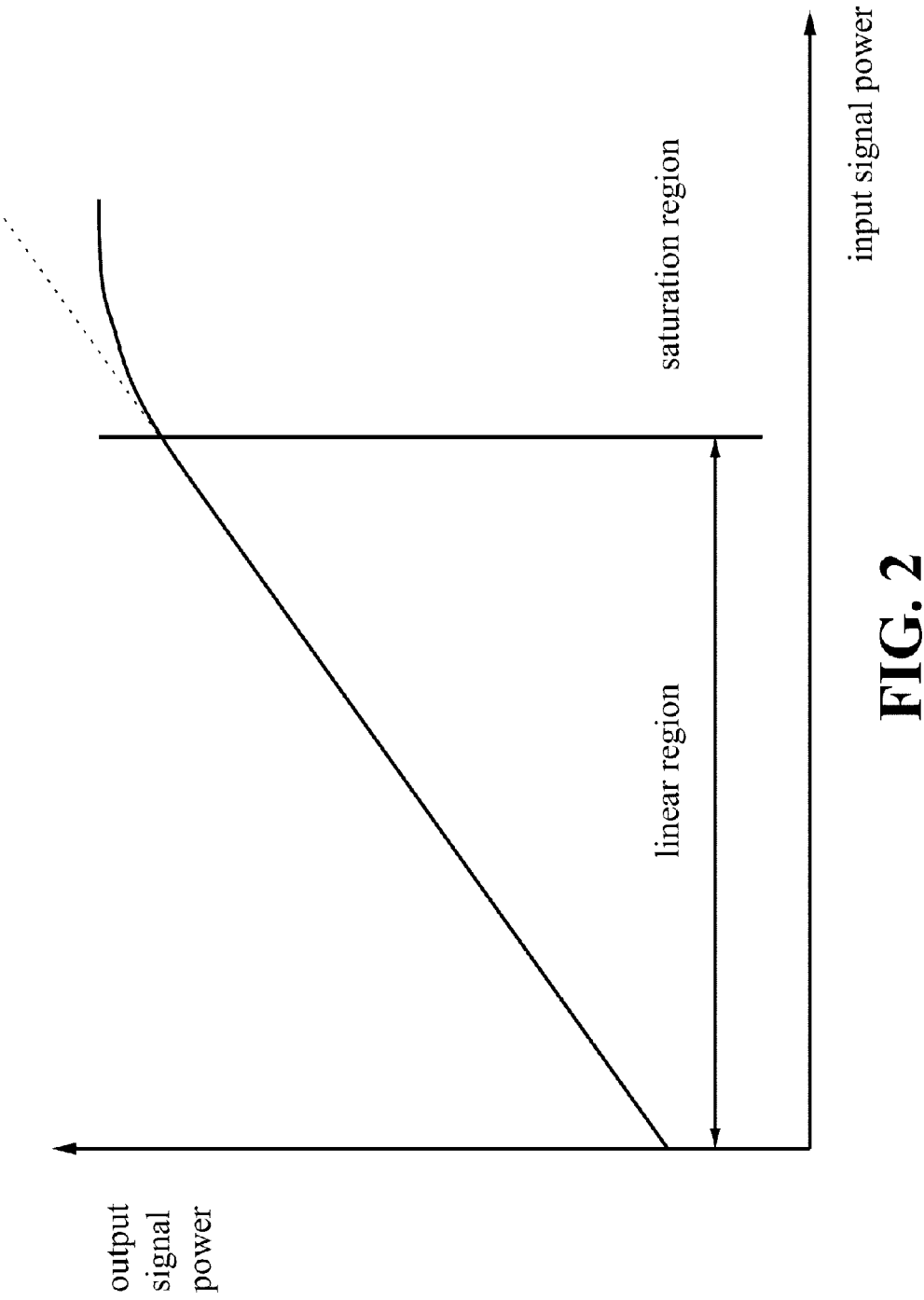
FIG. 2 shows a simplified input signal power to output signal power characteristic curve of the low-noise amplifying circuit in FIG. 1 according to one embodiment of the present disclosure.

FIG. 2 shows a simplified input signal power to output signal power characteristic curve of the low-noise amplifying circuit 120 in FIG. 1 according to one embodiment of the present disclosure. When the input signal power of the low-noise amplifying circuit 120 is in the linear region in FIG. 2, the output signal power of the low-noise amplifying circuit 120 is linearly correlated to the input signal power. When the input signal power of the low-noise amplifying circuit 120 is in the saturation region in FIG. 2, the output signal power of the low-noise amplifying circuit 120 is not linearly correlated to the input signal power. Accordingly, the distortions in the output signal of the low-noise amplifying circuit 120 deteriorate the performance of the demodulation operations. In this embodiment, the low-noise amplifying circuit 120 may be configured to provide three gains according to the signal strength of the wireless signals so as to keep the low-noise amplifying circuit 120 operating in the linear region in most circumstances. For example, in the embodiment in FIG. 3, the low-noise amplifying circuit 120 provides a high gain Gh to the wireless signals when the signal strength of the input signal is less than −40 dBm. The low-noise amplifying circuit 120 provides a medium gain Gm to the wireless signals when the signal strength of the input signal ranges from −40 dBm to −10 dBm, and provides a low gain Gl to the wireless signals when the signal strength of the input signal ranges from −10 dBm to 10 dBm and above.

The mixing circuit 130 is configured to operably mix radio frequency signals provided by the low-noise amplifying circuit 120 with an oscillating signal to generate corresponding intermediate frequency signals or corresponding baseband signals.

The filtering circuit 140 is configured to operably filter the mixed signals provided by the mixing circuit 130 to reduce or remove unwanted signals.

The variable gain amplifying circuit 150 is configured to operably receive the signals provided by the filtering circuit 140, and cooperate with the low-noise amplifying circuit 120 to provide a suitable gain to the filtered signals so that the other circuits may perform the demodulation operations more effectively. In the embodiment in FIG. 3, the variable gain amplifying circuit 150 may cooperate with the low-noise amplifying circuit 120 and provide four different gains Gv1~Gv4 to the filtered signals according to the signal strengths of the wireless signals.

The signal strength calculating circuit 160 is configured to operably calculate the signal strengths of the wireless signals. For example, the signal strength calculating circuit 160 may estimate the signal strengths of the wireless signals by calculating power spectrum densities of the wireless signals or accordingly to other suitable algorithms. In this embodiment, the signal strength calculating circuit 160 calculates the signals strength according to the signals provided by the low-noise amplifying circuit 120, and generates a corresponding signal strength value by looking up in a look-up table.

The analog to digital converting circuit 170 is configured to operably convert amplified signals provided by the variable gain amplifying circuit 150 to corresponding digital signals, and transmit the converted digital signals to the signal processing circuit 180 for further demodulation operations.

The demodulation circuit 182 is configured to operably perform the demodulation operations to the digital signals provided by the analog to digital converting circuit 170, e.g., the demodulation circuit 182 may perform Fourier transformations, convolutional decoding operations, and/or signal synchronization operations according to the digital signals.

The interference detection circuit 184 may configure the low-noise amplifying circuit 120, the mixing circuit 130, the signal strength calculating circuit 160, and/or other circuits to detect whether there are interference signals in frequency bands adjacent to the frequency band F1 utilized by the wireless LAN communication device 100. In one embodiment, when the wireless LAN communication device 100 utilizes a 2.4 GHz ISM frequency band for data communications, the interference detection circuit 184 may be configured to detect the interference signals in the frequency bands ranging from 2402 MHz to 2482 MHz.

Figure 4:
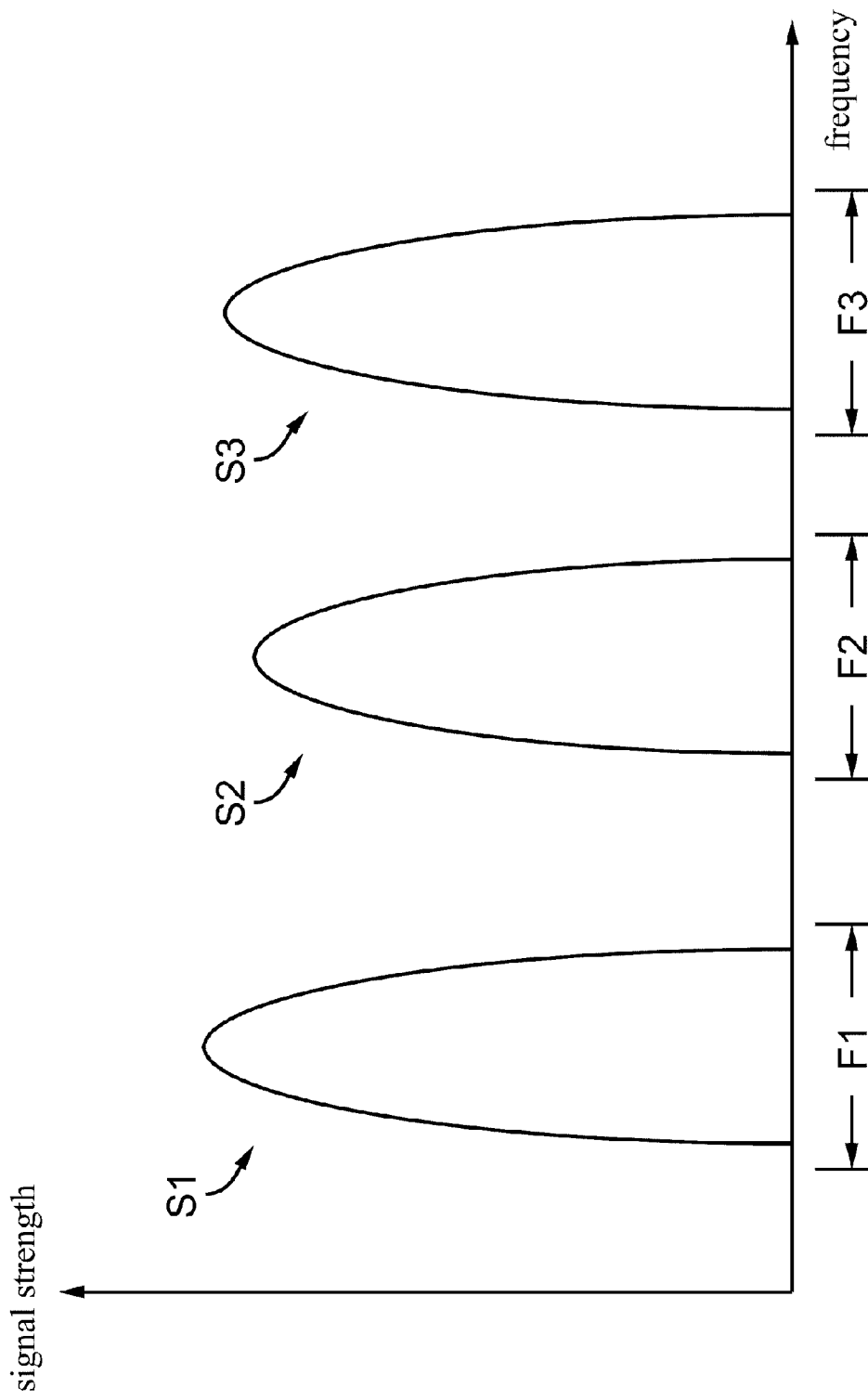
FIG. 4 shows a simplified frequency spectrum of several wireless signals according to one embodiment of the present disclosure.

FIG. 4 shows a simplified frequency spectrum of several wireless signals according to one embodiment of the present disclosure. In this embodiment, the wireless signals, which the wireless LAN communication device 100 transceives with the access point AP1 in the frequency band F1, are denoted as S1. Wireless signals S2 and S3 respectively in the frequency bands F2 and F3 are transmitted from other wireless communication devices, and not the wireless signals transceived between the wireless LAN communication device 100 and the access point AP1. Therefore, the wireless signals S2 and S3 are adjacent channel interference signals to the wireless communication device 100 in this embodiment. The interference detection circuit 184 configures the low-noise amplifying circuit 120, the mixing circuit 130, the signal strength calculating circuit 160 and/or other circuits to scan the frequency bands adjacent to the frequency band F1, and to calculate the signal strengths of the interference signals (e.g., calculate the power spectrum densities of the interference signals) to generate a detection result. The detection result of the interference detection circuit 184 may comprise a presence of the interference signals, the number of the interference signals, the signal strengths of the interference signals, the frequency bands of the interference signals, etc.

In this embodiment, the false alarm counting circuit 186 is configured to operably calculate the number of false alarms. In this embodiment, the false alarm is referred to a situation in which the wireless LAN communication device 100 receives the interference signals, noises, the signals transmitted from other wireless LAN communication devices in other basic service sets, or other adjacent channel interference signals. The demodulation circuit 182 erroneously regards the received signals as the signals transmitted from the access point AP1 and performs the demodulation operations. When the demodulation circuit 182 is performing the demodulation operations to the adjacent channel interference signals and the access point AP1 transmits packets to the wireless LAN communication device 100, the demodulation circuit 182 cannot perform the demodulation operations to the signals transmitted from the access point AP1. Therefore, the wireless LAN communication device 100 cannot successfully receive and demodulate the signals transmitted from the access point AP1 and the communication performance is affected.

Figure 5:
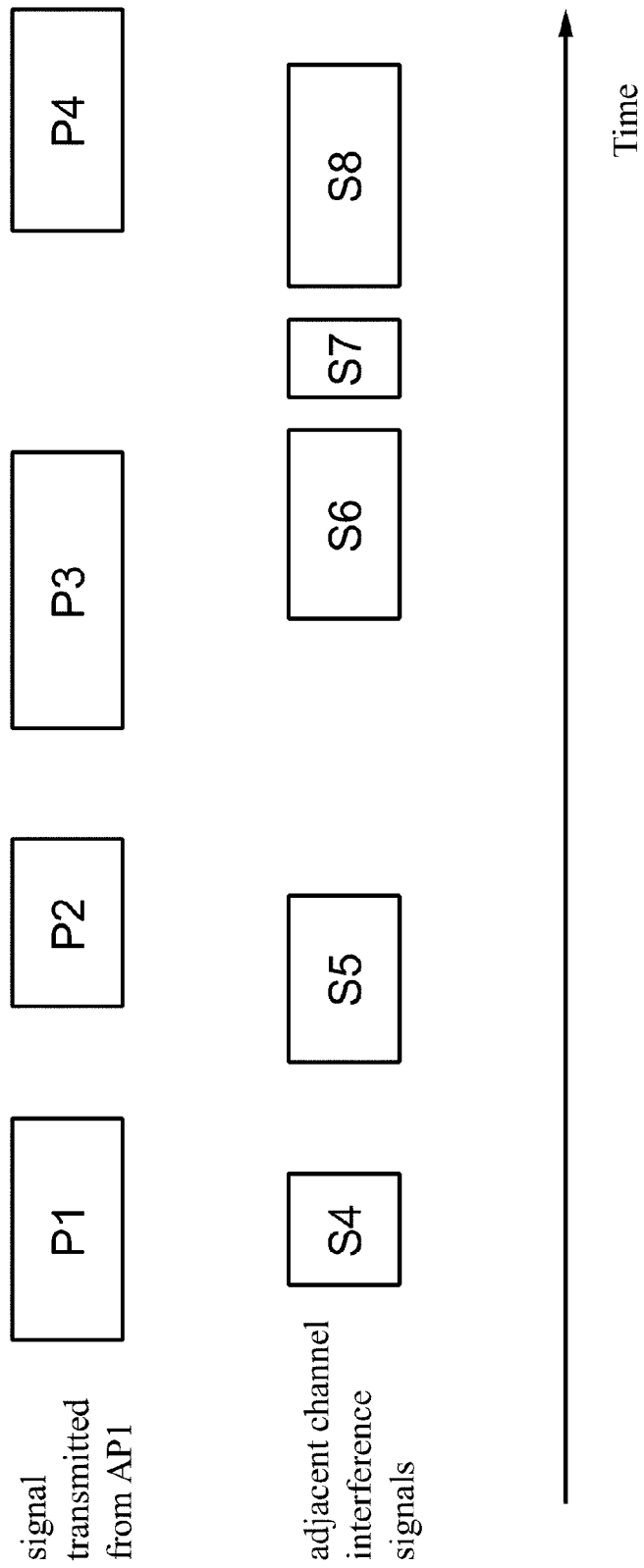
FIG. 5 shows a simplified timing diagram of several wireless signals according to one embodiment of the present disclosure.

FIG. 5 shows a simplified timing diagram of several wireless signals according to one embodiment of the present disclosure. In this embodiment, the access point AP1 transmits packets P1~P4 to the wireless LAN communication device 100 at different time points, and the signals S4~S8 represent the adjacent channel interference signals. When the adjacent channel interference signals S5 and S8 are received by the wireless LAN communication device 100, the demodulation circuit 182 erroneously starts to perform the demodulation operations. When the demodulation circuit 182 is demodulating the adjacent channel interference signals S5 and S8 and the packets P2 and P4 are transmitted to the wireless LAN communication device 100, the demodulation circuit 182 cannot perform the demodulation operations on the packets P2 and P4. Therefore, the wireless LAN communication device 100 cannot successfully receive and demodulate the packets P2 and P4 transmitted from the access point AP1.

The control circuit 188 is configured to operably configure the gain of the low-noise amplifying circuit 120 and/or the gain of the variable gain amplifying circuit 150 according to the detection result provided by the interference detection circuit 184 and according to the number of false alarms provided by the false alarm counting circuit 186. For example, when the detection result indicates the presence of the adjacent channel interference signals and the number of false alarms is greater than a false alarm threshold, the control circuit 188 decreases the gain of the low-noise amplifying circuit 120 and/or the gain of the variable gain amplifying circuit 150 to reduce the impacts of the adjacent channel interference signals.

In some preferred embodiments, the control circuit 188 further configures the gain of the low-noise amplifying circuit 120 and/or the gain of the variable gain amplifying circuit 150 according to the signal strengths provided by the signal strength calculating circuit 160. For example, when the detection result indicates the presence of the adjacent channel interference signals and the number of false alarms is greater than the false alarm threshold, the control circuit 188 decreases the gain of the low-noise amplifying circuit 120 and/or the gain of the variable gain amplifying circuit 150 if the signal strengths of the wireless signals are strong enough (e.g., greater than a first signal strength threshold).

In other embodiments, when the signal strengths of the adjacent channel interference signals are not strong (or the adjacent channel interference signal does not exist) and the number of false alarms is not large, the control circuit 188 configures the gain of the low-noise amplifying circuit 120 and/or the gain of the variable gain amplifying circuit 150 by looking up in the look-up table according to the signal strengths provided by the signal strength calculating circuit 160. Therefore, before performing the analog to digital converting operations by the analog to digital converting circuit 170, the amplitude and the signal level of the wireless signals may be suitable configured to reduce the quantization errors. The gain of the low-noise amplifying circuit 120 and/or the gain of the variable gain amplifying circuit 150 may also be dynamically configured according to the characteristics of the received signals.

The functional blocks in FIG. 1 may be respectively realized by hardware, software, or the collaboration of hardware and software. Multiple functional blocks may be realized by a single integrated circuit element, and a single functional block may also be realized with multiple circuit elements. For example, the low-noise amplifying circuit 120, the variable gain amplifying circuit 150, and/or the filtering circuit 140 may be realized by a single circuit element, and the signal processing circuit 180 may realized by a microprocessor or an application specific integrated circuit.

Figure 6:
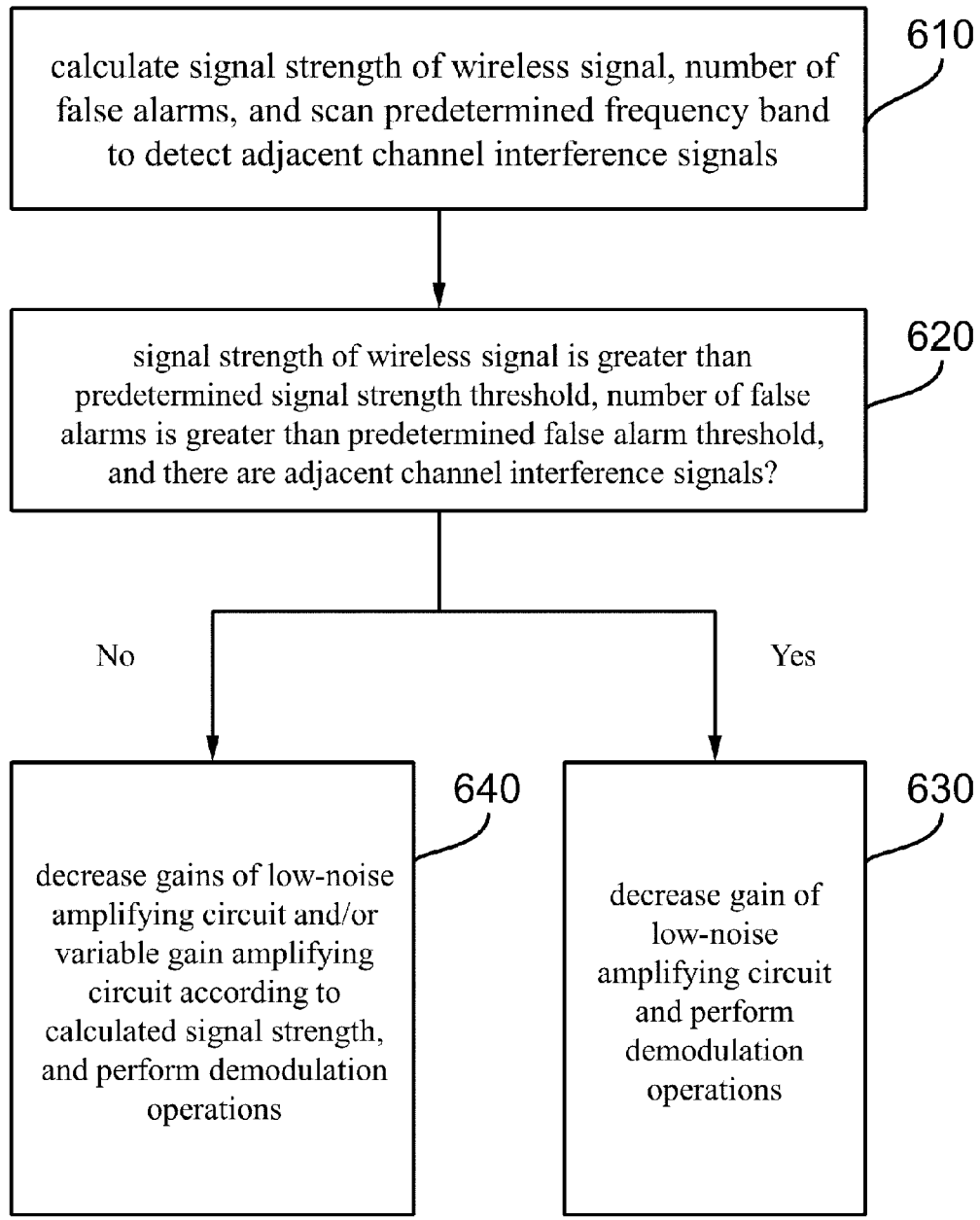
FIG. 6 shows a simplified flowchart of a signal processing method for configuring the gains of the amplifier circuits in FIG. 1 according to one embodiment of the present disclosure.

FIG. 6 shows a simplified flowchart of a signal processing method for configuring the gain(s) of the amplifier circuits of the wireless LAN communication device 100 in FIG. 1 according to one embodiment of the present disclosure. The operations of the wireless LAN communication device 100 are further explained below with FIG. 1 and FIG. 6.

In the operation 610, the signal strength calculating circuit 160 calculates the signal strengths of the wireless signals, and the false alarm counting circuit 186 calculates the number of false alarms. The interference detection circuit 184 configures the low-noise amplifying circuit 120, the mixing circuit 130, the signal strength calculating circuit 160, and/or the other circuits to detect the interference signals in the predetermined frequency bands at a suitable time. For example, the wireless LAN communication device 100 scans the predetermined frequency bands adjacent to the frequency band F1, calculates the power spectrum densities of the interference signals to determine whether there is an adjacent channel interference signal (or multiple adjacent channel interference signals) by the signal strength calculating circuit 160, and generates the detection result by the interference detection circuit 184 to indicate the presence of the adjacent channel interference signal(s), the number of the adjacent channel interference signal(s), the signal strengths of the adjacent channel interference signal(s), the frequency bands of the adjacent channel interference signal(s), etc.

In the operation 620, the control circuit 188 receives the signal strengths of the wireless signals provided by the signal strength calculating circuit 160, the number of false alarms provided by the false alarm counting circuit 186, and the detection result provided by the interference detection circuit 184. When the signal strengths are greater than the predetermined signal strength threshold, the number of false alarms is greater than a predetermined false alarm threshold, and the detection result indicates the presence of the interference signal(s) in adjacent frequency bands, the adjacent channel interference signal(s) may seriously affect the communication performance and the signal strengths of the wireless signals are strong enough. Therefore, the method proceeds to the operation 630. Otherwise, the method proceeds to the operation 640.

In the operation 630, the control circuit 188 decreases the gain of the low-noise amplifying circuit 120 to prevent the low-noise amplifying circuit 120 and/or the variable gain amplifying circuit 150 from operating in the saturation region to reduce the impacts of the adjacent channel interference signals. The control circuit 188 also configures the demodulation circuit 182 to perform the demodulation operations.

In the operation 640, the control circuit 188 configures the gain of the low-noise amplifying circuit 120 and/or the gain of the variable gain amplifying circuit 150 according to the signal strengths of the wireless signals provided by the signal strength calculating circuit 160, and configures the demodulation circuit 182 to perform the demodulation operations.

In the embodiment in FIG. 6, the wireless LAN communication device 100 may configure the gain of the low-noise amplifying circuit 120 and/or the gain of the variable gain amplifying circuit 150 so that each functional block of the wireless LAN communication device 100 may be suitably configured to perform the demodulation operations. When the signal strengths of the wireless signals received by the wireless LAN communication device 100 are strong enough and the adjacent channel interference signals exist, the adjacent channel interference signals may result in a large number of false alarms. Therefore, the control circuit 188 may decrease the gain of the low-noise amplifying circuit 120 and/or the gain of the variable gain amplifying circuit 150 to prevent the interference signals from being excessively amplified. The low-noise amplifying circuit 120 and the variable gain amplifying circuit 150 may operate in the linear region to prevent the demodulation performance from the influences of the nonlinearity when amplifying the wireless signals. Accordingly, the impacts of the adjacent channel interference signals on the communication performance may be reduced.

Moreover, when there is no adjacent channel interference signal, the number of false alarms is not large, or the signal strengths of the wireless signals are not so strong, the control circuit 188 may configure the low-noise amplifying circuit 120 and/or the variable gain amplifying circuit 150 to amplify the wireless signals with higher gain(s) and the demodulation performance would not be affected seriously. Therefore, the wireless LAN communication device 100 may also maintain the communication performance when the signal strengths are not weak.

In other embodiments, the signal strength calculating circuit 160 may also generate the signal strengths of the wireless signals by looking up in the look-up table according to the output signals provided by other circuits, or by utilizing other algorithms. For example, the signal strength calculating circuit 160 may calculate the signal strengths of the wireless signals according to the amplified signals provided by the variable gain amplifying circuit 150.

In other embodiments, the signal strength calculating circuit 160 may calculate the signal strengths of the wireless signals according to the output signals provided by different circuits in different periods of time. For example, in the operation 630, the signal strength calculating circuit 160 may calculate the signal strengths of the wireless signals according to the converted signals provided by the analog to digital converting circuit 170.

In other embodiments, the variable gain amplifying circuit 150 may provide different numbers of gains or difference values of gains for cooperating with each of the gains of the low-noise amplifying circuit 120.

In the operation 610 above, the control circuit 188 may configure the low-noise amplifying circuit 120 and the variable gain amplifying circuit 150 to amplify the wireless signals for detecting weak signals.

In other embodiments, in the operation 630, the control circuit 188 may decrease the gain of the variable gain amplifying circuit 150 before decreasing the gain of the low-noise amplifying circuit 120. After the gain of the variable gain amplifying circuit 150 is configured to be the lowest value, the gain of the low-noise amplifying circuit 120 is decreased and the gain of the variable gain amplifying circuit 150 is further adjusted accordingly.

In other embodiments, the control circuit 188 may decrease and fix the gain of the low-noise amplifying circuit 120 in the operation 630. In the following demodulation operations, only the gain of the variable gain amplifying circuit 150 is adjusted.

In other embodiments, the control circuit 188 may decrease the gain of the low-noise amplifying circuit 120 for several times, and accordingly configure the gain of the variable gain amplifying circuit 150 in the following demodulation operations.

In other embodiments, the control circuit 188 may simultaneously decrease the gains of the low-noise amplifying circuit 120 and the variable gain amplifying circuit 150 to reduce the impacts of the adjacent channel interference signals.

In the above embodiments, the control circuit 188 may utilize different false alarm thresholds according to the frequency band(s) and/or the number of the interference signal(s) detected by the interference detection circuit 184. For example, when the number of the interference signals is large, the wireless LAN communication device 100 may receive more interference signals which may result in more false alarms. Therefore, the control circuit 188 may configure the false alarm threshold to be a lower value when the number of the interference signals is large. In other embodiments, the control circuit 188 may utilize different false alarm thresholds according to frequency difference between the frequency band(s) of the interference signals and the frequency band F1 utilized by the wireless LAN communication device 100.

Moreover, the control circuit 188 may reset the number of false alarms calculated by the false alarm counting circuit 186 at a suitable time. For example, the control circuit 188 may reset the number of false alarms calculated by the false alarm counting circuit 186 after decreasing the gain of the low-noise amplifying circuit 120. Thus, the false alarm counting circuit 186 does not accumulate the number of false alarms counted before the gain of the low-noise amplifying circuit 120 is decreased.

In other embodiments, in the operation 630, the control circuit 188 may configure the method to proceed to the operation 640 when the signal strengths of the wireless signals provided by the signal strength calculating circuit 150 is less than the signal strength threshold in the operation 620 or less than another predetermined signal strength threshold. Therefore, the gain of the low-noise amplifying circuit 120 may be increased so that weak wireless signals may also be demodulated effectively.

In the above embodiments, the wireless LAN communication device 100 may continuously or intermittently performs the signal processing method is FIG. 6 for configuring the gain of the low-noise amplifying circuit 120 and/or the gain of the variable gain amplifying circuit 150.

In the above embodiments, when the adjacent channel interference signals incur more false alarms and the signal strengths of the wireless signals are strong enough, the wireless LAN communication device 100 configures the gain of the low-noise amplifying circuit 120 and/or the gain of the variable gain amplifying circuit 150 to reduce the impact of the adjacent channel interference signals on the communication performance. Moreover, when the adjacent channel interference signal is absent or weak, the wireless LAN communication device 100 may maintain the communication performance by suitably configuring the gain of the low-noise amplifying circuit 120 and/or the gain of the variable gain amplifying circuit 150.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A wireless LAN communication device, comprising:
   an amplifying circuit configured to operably provide a gain to a first wireless signal;
   an interference detection circuit configured to operably detect adjacent channel interference signals of the first wireless signal to generate a detection result;
   a signal strength calculating circuit configured to operably calculate a signal strength of the first wireless signal;
   a false alarm counting circuit configured to operably calculate a number of false alarms incurred by the adjacent channel interference signals; and
   a control circuit configured to operably configure the gain of the amplifying circuit according to the detection result and the number of false alarms;
   wherein the control circuit decreases the gain of the amplifying circuit when the signal strength of the first wireless signal is greater than a first signal strength threshold, the detection result indicates a presence of the adjacent channel interference signals, and the number of false alarms is greater than a false alarm threshold.

2. The wireless LAN communication device of claim 1, wherein the interference detection circuit generates the detection result by scanning power spectrum densities of frequency bands adjacent to a frequency band of the first wireless signal.

3. The wireless LAN communication device of claim 1, wherein after the control circuit decreased the gain of the amplifying circuit, the control circuit increases the gain of the amplifying circuit when a signal strength of a second wireless signal is less than a second signal strength threshold.

4. The wireless LAN communication device of claim claim 1, wherein the amplifying circuit comprising:
   a low-noise amplifying circuit configured to operably amplify the first wireless signal with a first gain; and
   a variable gain amplifying circuit configured to operably amplify the first wireless signal with a second gain.

5. The wireless LAN communication device of claim 4, wherein when the control circuit decreases the gain of the amplifying circuit, the control circuit decreases the second gain of the variable gain amplifying circuit before decreasing the first gain of the low-noise amplifying circuit.

6. A wireless LAN communication device, configured to operably associate with a first access point, comprising:
   an amplifying circuit configured to operably provide a gain to a first wireless signal;
   a signal strength calculating circuit configured to operably calculate a signal strength of the first wireless signal;
   a demodulation circuit configured to operably demodulate the first wireless signal; and
   a control circuit coupled with the amplifying circuit, the signal strength calculating circuit, and the demodulation circuit;
   wherein the control circuit decreases the gain of the amplifying circuit when both following criteria are met:
   the signal strength of the first wireless signal is greater than a first signal strength threshold; and
   a number of demodulation operations performed by the demodulation circuit on wireless signals transmitted from a second access point is greater than a false alarm threshold.

7. The wireless LAN communication device of claim 6, wherein after the control circuit decreased the gain of the amplifying circuit, the control circuit increases the gain of the amplifying circuit when a signal strength of a second wireless signal is less than a second signal strength threshold.

8. The wireless LAN communication device of claim 7, wherein the amplifying circuit comprising:
   a low-noise amplifying circuit configured to operably amplify the first wireless signal with a first gain; and
   a variable gain amplifying circuit configured to operably amplify the first wireless signal with a second gain.

9. The wireless LAN communication device of claim 8, wherein when the control circuit decreases the gain of the amplifying circuit, the control circuit decreases the second gain of the variable gain amplifying circuit before decreasing the first gain of the low-noise amplifying circuit.

10. A signal processing circuit of a wireless LAN communication device, configured to operably configure a gain which an amplifying circuit of the wireless LAN communication device provides to a wireless signal, comprising:
    an interference detection circuit configured to operably detect adjacent channel interference signals of the wireless signal to generate a detection result;
    a signal strength calculating circuit configured to operably calculate a signal strength of the wireless signal;
    a false alarm counting circuit configured to operably calculate a number of false alarms incurred by the adjacent channel interference signals; and
    a control circuit configured to operably configure the gain of the amplifying circuit according to the detection result and the number of false alarms;
    wherein the control circuit decreases the gain of the amplifying circuit when the signal strength is greater than a signal strength threshold, the interference detection circuit detects a presence of the adjacent channel interference signals, and the number of false alarms is greater than a false alarm threshold.

11. The wireless LAN communication device of claim 10, wherein the interference detection circuit generates the detection result by scanning power spectrum densities of frequency bands adjacent to a frequency band of the wireless signal.

12. A signal processing method for a wireless LAN communication device, comprising:
    detecting adjacent channel interference signals of a first wireless signal to generate a detection result;

calculating a number of false alarms incurred by the adjacent channel interference signals;

configuring a gain of an amplifying circuit of the wireless LAN communication device according to the detection result and the number of false alarms;

calculating a signal strength of the first wireless signal; and decreasing the gain of the amplifying circuit when the signal strength of the first wireless signal is greater than a first signal strength threshold, the detection result indicates a presence of the adjacent channel interference signals, and the number of false alarms is greater than a false alarm threshold.

13. The signal processing method of claim 12, wherein the detection result is generated by scanning power spectrum densities of frequency bands adjacent to a frequency band of the first wireless signal.

14. The signal processing method of claim 12, further comprising:

after decreasing the gain of the amplifying circuit, increasing the gain of the amplifying circuit when a signal strength of a second wireless signal is less than a second signal strength threshold.

15. The signal processing method of claim 12, further comprising:

decreasing a second gain of a variable gain amplifying circuit of the amplifying circuit before decreasing a first gain of a low-noise amplifying circuit of the amplifying circuit.

\* \* \* \* \*